United States Patent [19]
Berry et al.

[11] Patent Number: 6,121,971
[45] Date of Patent: Sep. 19, 2000

[54] METHOD AND SYSTEM FOR PROVIDING VISUAL HIERARCHY OF TASK GROUPS AND RELATED VIEWPOINTS OF A THREE DIMENSIONAL ENVIRONMENT IN A DISPLAY OF A COMPUTER SYSTEM

[75] Inventors: Richard Edmond Berry; Scott Harlan Isensee, both of Georgetown, Tex.; David John Roberts, Stockton, United Kingdom; Didier Daniel Bardon, Austin, Tex.

[73] Assignee: International Business Machines Corporation, Armonk, N.Y.

[21] Appl. No.: 08/789,338

[22] Filed: Jan. 27, 1997

[51] Int. Cl.[7] .................................................. G06T 15/00
[52] U.S. Cl. ............................................................ 345/419
[58] Field of Search ................................... 345/418, 419, 345/427, 428

[56] References Cited

U.S. PATENT DOCUMENTS

| | | | |
|---|---|---|---|
| 5,261,044 | 11/1993 | Dev et al. ................................ | 395/159 |
| 5,276,785 | 1/1994 | Mackinlay et al. ...................... | 345/427 |
| 5,528,735 | 6/1996 | Strasnick et al. ........................ | 395/127 |

OTHER PUBLICATIONS

Mackinlay, Jock D.; Card, Stuart K.; Robertson, George G.; Rapid Controlled Movement Through a Virtual 3D Workspace, *Computer Graphics*, vol. 24, No. 4, Aug. 1990.

*Primary Examiner*—Phu K. Nguyen
*Assistant Examiner*—Cliff N. Vo
*Attorney, Agent, or Firm*—Sawyer & Associates; Volel Emile

[57] ABSTRACT

A method and system for providing visual hierarchy of task groups and related viewpoints of a three dimensional display of a computer system is disclosed. The method and system comprises providing a group of task related objects and positioning an object within an associated viewpoint when the object is to be utilized. In the present invention each task group is composed of objects related to a particular user task. Associated with each task group is a viewpoint in the 3D space. The visual organization of task groups and associated viewpoints allows the user to traverse the task-object hierarchy smoothly, seeing more or less of the surrounding task context as desired.

11 Claims, 4 Drawing Sheets

METHOD AND SYSTEM FOR PROVIDING VISUAL HIERARCHY OF TASK GROUPS AND RELATED VIEWPOINTS OF A THREE DIMENSIONAL ENVIRONMENT IN A DISPLAY OF A COMPUTER SYSTEM

CROSS-REFERENCE TO RELATED APPLICATIONS

The present application is related to application Ser. No. 08/789,343 filed Jan. 27, 1997 entitled "A Method and System for Classifying User Objects in a Three-Dimensional (3D) Environment on a Display in a Computer System," application Ser. No. 08/789,345 filed Jan. 27, 1997, entitled "A Method and System for Providing Preferred Face Views of Objects in a Three-Dimensional (3D) Environment on a Display in a Computer System," application Ser. No. 08/789,344 filed Jan. 31, 1997, entitled "Method and System for Navigating Through Opaque Structures on a Display," application Ser. No. 08/789,341 Jan. 27, 1997, entitled "A Method and System for Effectively Controlling an Object in a Three-Dimensional Environment in a Display of a Computer System," and application Ser. No. 08/789,342, filed Jan. 27, 1997 entitled "A Method and System for Providing an Improved view of an Object in a Three-Dimensional (3D) Environment on a Computer Display" filed on the same date as the present application and assigned to the assignee of the present application.

TECHNICAL FIELD

The present invention relates generally to organizing objects and navigating within a three-dimensional (3D) environment within a display in a computer system and more particularly relates to providing a classification of user objects in such a display.

BACKGROUND

Presently in a computer environment the screen or display on the computer has a plurality of icons and windows thereon. In a typical environment including a window and a pointing device, to access certain information it is important to point to and then click on a particular icon or window. Oftentimes, this type of environment is not efficient unless the user has a specific understanding of the particular nomenclature and syntax of the particular environment of the computer. Hence, a user that is not familiar with that syntax or nomenclature could become easily confused and spend a significant amount of time trying to understand how to navigate and access certain information. This can cause user frustration as well as create considerable inefficiency in the system.

The lack of a visual organizational paradigm for task-oriented user objects within 3D spaces, such as that found in virtual reality worlds using Virtual Reality Modeling Language (VRML) on the Internet, makes it difficult to design 3D user environments for typical business tasks. Currently, users are on their own to navigate within the world and find positions that facilitate doing their work. Lacking a visual organization paradigm that designers can follow there are often no convenient viewpoints from which to view all of the objects the user needs to accomplish a particular task or set of related tasks. This causes an over reliance on navigating back and forth between viewpoints resulting in loss of productivity and user frustration.

There is currently no set of standardized distinctions or object classification scheme for use in a 3D environment in which useful work is accomplished. Ease of use and productivity will be crucial aspects of making 3D user environments easy to use and productive in such an environment. Having a consistent scheme supportive of navigation and predictable object interaction is extremely important.

What is needed is a system and method for enhancing the use of certain aspects of a 3-D environment where useful work is done on a computer display, without creating undue complexity. The system should be easy to implement and compatible with existing computer systems. The present invention addresses such a need.

SUMMARY

A method and system for providing visual hierarchy of task groups and related viewpoints of a three dimensional display of a computer system is disclosed. The method and system comprises providing a group of task related objects and positioning an object within an associated viewpoint when the object is to be utilized. In the present invention each task group is composed of objects related to a particular user task. Associated with each task group is a viewpoint in the 3D space. The visual organization of task groups and associated viewpoints allows the user to traverse the task-object hierarchy smoothly, seeing more or less of the surrounding task context as desired. In the present invention, some viewpoints are associated with and would move with the object. In addition, in a preferred embodiment a user would always be positioned at a viewpoint of their choosing.

DETAILED DESCRIPTION

The present invention relates to organizing and navigating within a three-dimensional (3D) environment within a display on a computer system. The following description is presented to enable one of ordinary skill in the art to make and use the illustrative embodiment and is provided in the context of a patent application and its requirements. Various modifications to the illustrative embodiment will be readily apparent to those skilled in the art and the generic principles herein may be applied to other embodiments. Thus, the illustrative embodiment is not intended to be limited to the embodiment shown but is to be accorded the widest scope consistent with the principles and features described herein.

Figure 1:
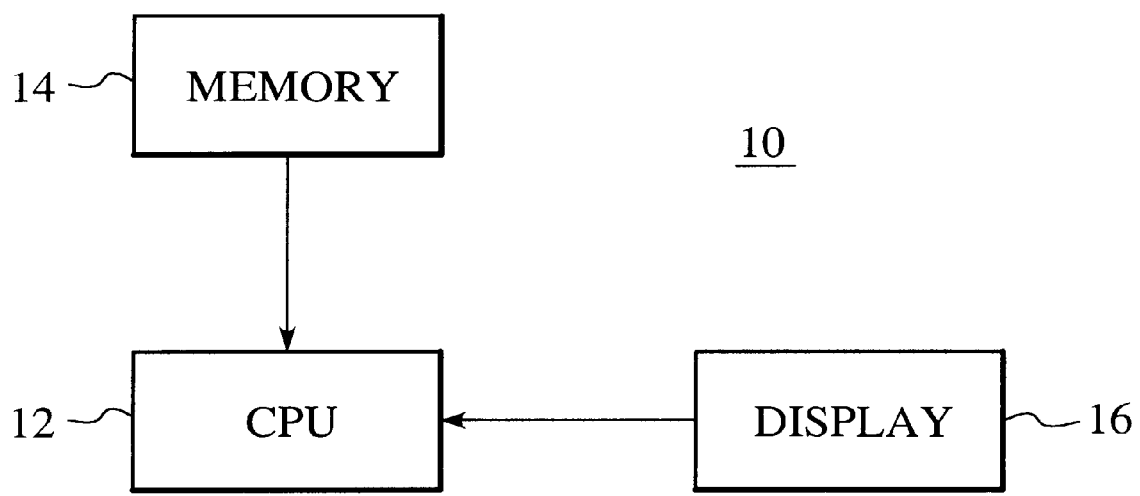
FIG. 1 is a block diagram of a computer system.
Figure 2:
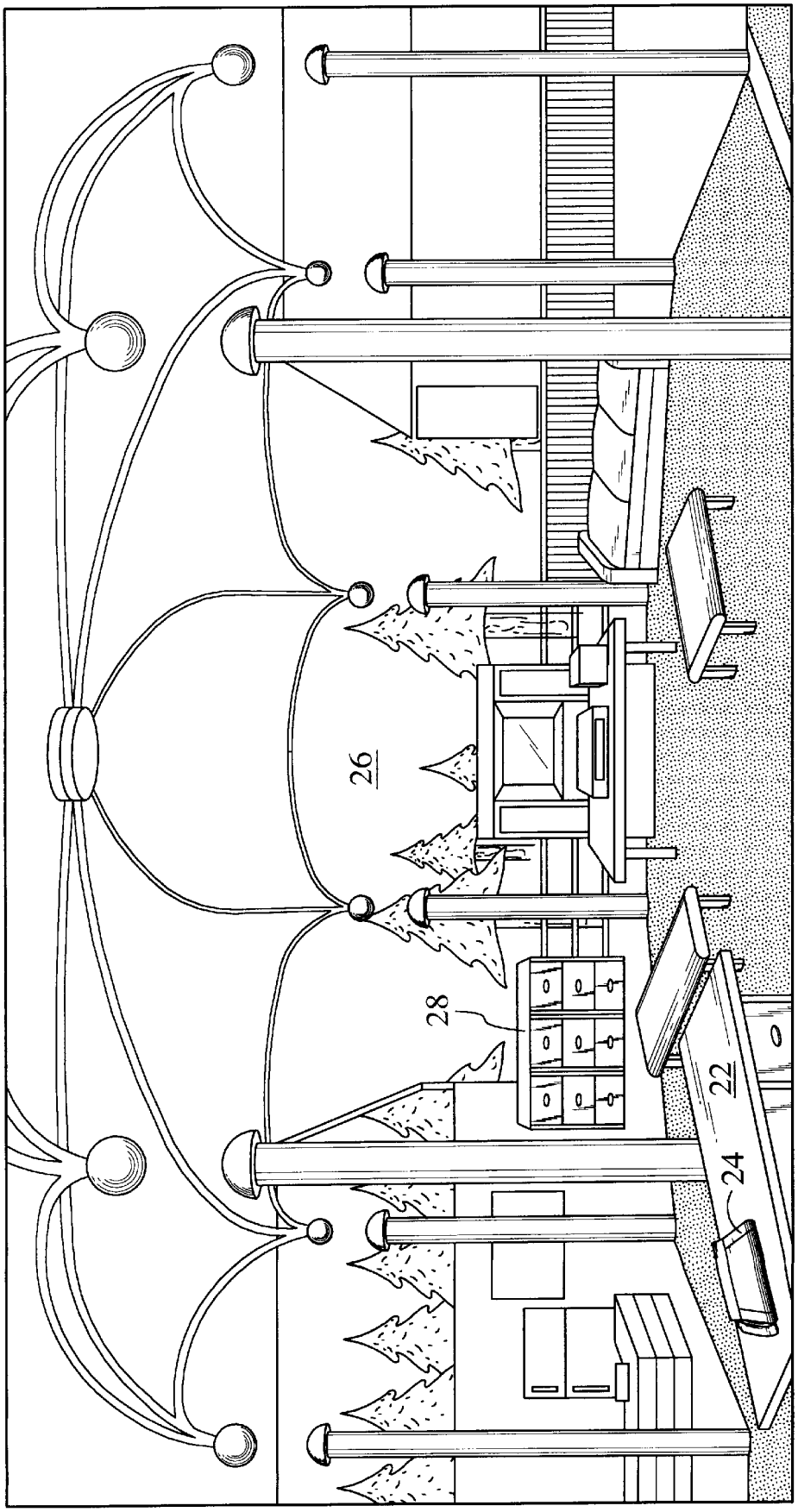
FIG. 2 is a three dimensional representation inside a home on a display of a computer system.

In the present invention, three dimensional ("3D") representations are utilized to show particular environments on a display 16 of a computer system 10 as shown in FIG. 1. For example, a home environment can be depicted on the display utilizing various 3D representations. Referring now to FIG. 2, what is shown is a 3D representation of a home 20 in which there is a desk 22, telephone 24, atrium 26, file cabinets 28, and other objects that make up the 3D representation. This 3D representation of certain of these objects can be containers for different information. For example, the desk 22 could include drawers, each of the drawers includes files, as in a typical office environment.

In a 3D environment in accordance with the present invention, a user can move their viewpoint or navigate through the home in two ways. One way to navigate in the environment is for the user's viewpoint to move through the home through the movement of the pointing (mouse, cursor or the like) device to simulate walking through the home. The other way to navigate in the environment is through providing certain events to facilitate user viewpoint movement from one point to another through the 3D environment.

Hence, to facilitate this second example, it is desirable to use objects as containers in the appropriate fashion to provide the particular information. So, for example, using a pointing device such as a mouse or the like in a Windows environment, a desk could be pointed to and clicked on, the user viewpoint would then move closer to the desk, in a position where the drawers could be seen. A particular drawer could be clicked on and then opened, revealing a plurality of files. Thereafter, a particular file could be clicked on, and a representation of that file would be removed from the drawer and provided for access to the user. Thereafter, the user could then click on the file and flip through the various documents in the file.

In another example, the telephone could be clicked on to bring the user viewpoint closer to the telephone. The user could then dial a number by using the keypad on the telephone to dial a particular number. In addition, there may be a fax facility on the telephone which could be used in which the computer system would then act as a fax machine. Accordingly, by using this 3D representation, using various objects in a 3D representation as containers rather than the typical Windows environment in which there are a plurality of windows and icons to be clicked on that may or may not be representative of the particular task that is to be performed, a system is provided in which it would be easier for a user to navigate and use in an expeditious and efficient manner.

This 3D representation allows for certain advantages while performing useful works. These advantages will be described below in conjunction with the accompanying figures.

User-Task Orientation

Figure 3:
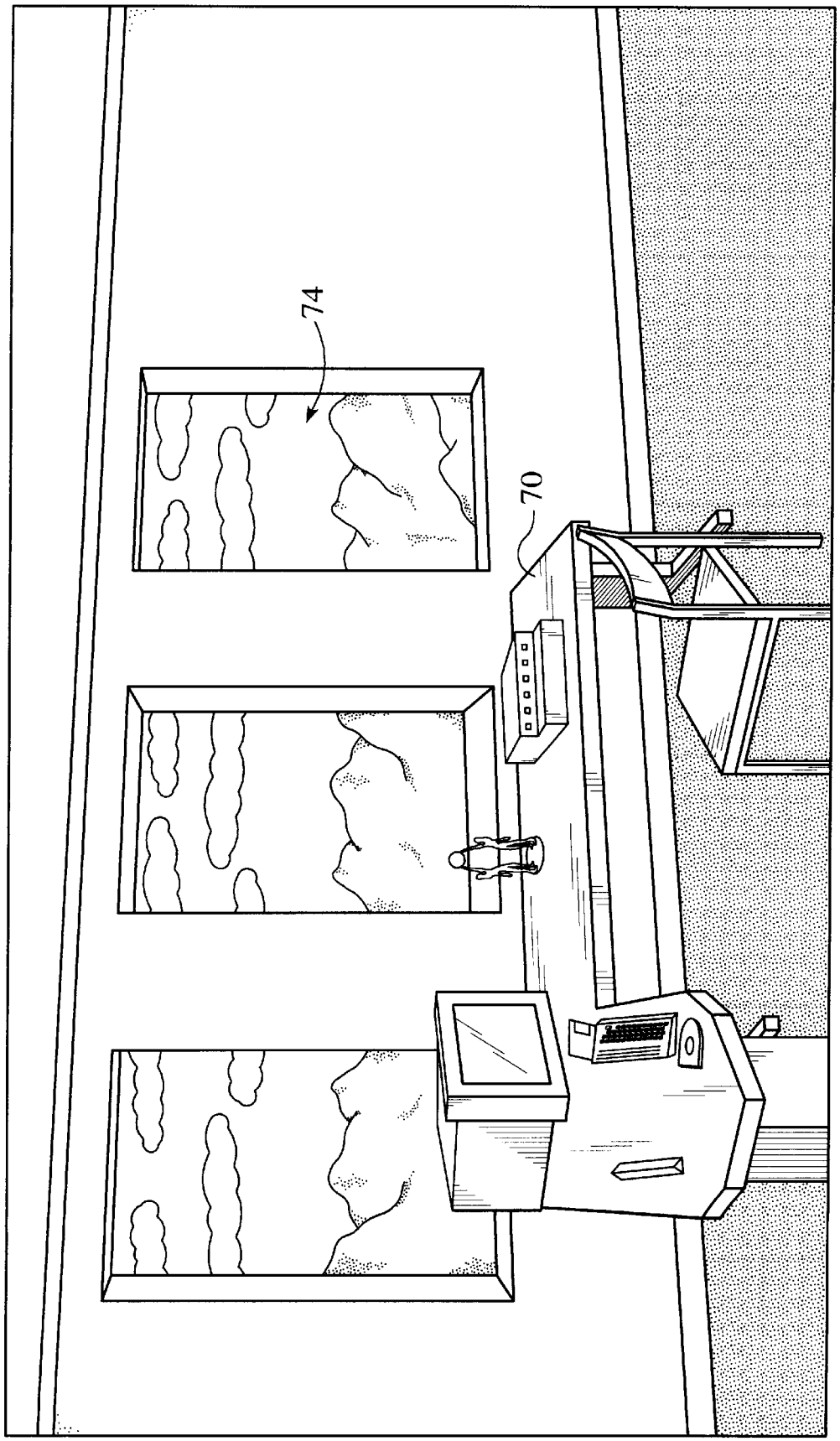
FIG. 3 is a depiction of one embodiment, the user-task orientation of objects in accordance with the present invention.

FIG. 3 is a depiction of one embodiment, the user-task orientation of objects in accordance with the present invention.

The world view allows designers and users to organize objects spatially, as in the real world Spatial organization helps users find things and focus on their tasks Groups of objects can be arranged to support a variety of task contexts Distant ground, middle ground, and foreground provide levels of task supporting context.

A desk 70 supports grouping of objects used in a task. A room 72 groups things used together at the next higher level. The location 74 in the world provides the highest level grouping.

Figure 4:
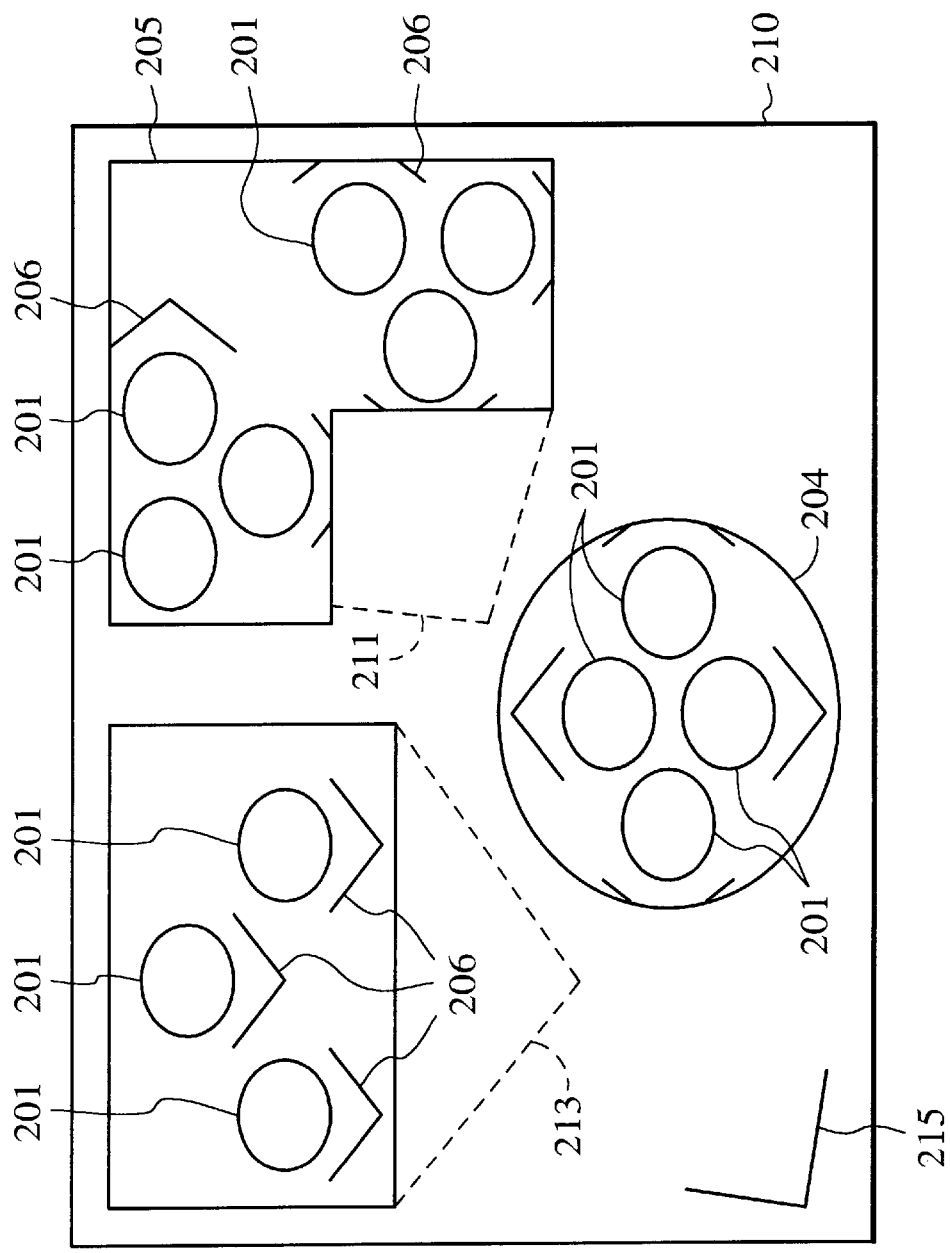
FIG. 4 is a diagram illustrating the task-view point relationship of a plurality of objects.

Referring now to FIG. 4, the proposed visual organizational paradigm is based on groups of task-related objects, called task groups, and viewpoints associated with each task group. Task groups and their associated viewpoints are nested in hierarchies using natural metaphors, such as desks, tables, and rooms.

FIG. 4 is a diagram illustrating the task-view point relationship of a plurality of objects. When the user wishes to focus on any individual object 201 they are positioned to the viewpoint associated with that object (e.g., shown by the angles 206 nearest each object). Related objects used within a task are grouped using natural containers such as areas of a desk or table (e.g., shown by the rectangles 202, 205 and circle 204). Each container 202, 204 and 205 has an associated viewpoint that is designed to insure visibility of the task group it contains. Successively higher levels of containment 211, 213, 215 (e.g., in a room indicated by the large rectangle 210) provide successively broader viewpoints.

Accordingly, in the present invention task and viewpoints have the following predetermined relationships. Objects are grouped to support the user's tasks. Preferred face views are chosen to focus the user on task objects and task groups. Related-task objects are grouped using containers such as desks, tables, drawers, and walls. Task groups have face views associated with their container. Task groups can be nested. Viewpoints at successively higher levels provide broader context such as desks, rooms and buildings. Viewpoints are chosen based on the location of groups and objects within them, independent of individual group and object viewpoints.

In the present invention, this visual organizational paradigm allows designers to create 3D user environments that are intuitive and immediately productive for a given set of tasks. This paradigm allows users to select a level of viewing detail appropriate to the current situation, and allows users to easily move from one level to another to either broaden or narrow their focus.

Although the system and method has been described in accordance with the embodiments shown, one of ordinary skill in the art will readily recognize that there could be variations to the embodiments and those variations would be within the spirit and scope of the above-described system and method. Accordingly, many modifications may be made by one of ordinary skill in the art without departing from the spirit and scope of the appended claims.

What is claimed is:

1. A method for providing a visual hierarchy of task groups and related view points of a three dimensional display of a computer system comprising the steps of:

(a) providing at least one task group of task related objects, each of the objects having an associated viewpoint;

(b) providing a hierarchy of the at least one task group, each level of the hierarchy having an associated viewpoint; and (c) positioning an object or a level of the hierarchy within its associated viewpoint when the object or the level is to be utilized.

2. The method of claim 1 wherein the providing step (a) further comprises the step of grouping task related objects in a plurality of containers.

3. The method of claim 2 in which each of the plurality of containers includes an associated viewpoint.

4. The method of claim 3 in which successively higher levels of containers provide successively broader viewpoints.

5. The method of claim 4 in which the successively higher level containers comprises an object within a room, a room within a house and the house.

6. A system for providing a visual hierarchy of task groups and related viewpoints of a three dimensional display of a computer system comprising:

means for providing at least one task group of related objects, each of the objects having an associated viewpoint;

means for providing a hierarchy of the at least one task group, each level of the hierarchy having an associated viewpoint; and means for positioning an object or a level of the hierarchy within its associated viewpoint when the object or the level is to be utilized.

7. The system of claim 6 wherein the providing means further comprises means for grouping task related objects in a plurality of containers.

8. The system of claim 7 in which each of the plurality of containers includes an associated viewpoint.

9. The system of claim 8 in which successively higher levels of containers provide successively broader viewpoints.

10. The system of claim 9 in which the successively higher level containers comprises an object within a room, a room within a house and the house.

11. A computer readable medium with program instructions for providing a visual hierarchy of task groups and related view points of a three dimensional display of a computer system, comprising instructions for:

(a) providing at least one task group of task related objects, each of the objects having an associated viewpoint;

(b) providing a hierarchy of the at least one task group, each level of the hierarchy having an associated viewpoint; and (c) positioning an object or a level of the hierarchy within its associated viewpoint when the object or the level is to be utilized.

* * * * *